United States Patent [19]

Yackiw

[11] 4,328,273

[45] May 4, 1982

[54] SEAL HAVING RESILIENT CORE AND OUTER COVER

[75] Inventor: Charles Yackiw, Fairport, N.Y.

[73] Assignee: Schlegel Corporation, Rochester, N.Y.

[21] Appl. No.: 238,653

[22] Filed: Feb. 26, 1981

[51] Int. Cl.[3] .......................... B32B 3/06; B32B 3/08; B32B 5/20

[52] U.S. Cl. ...................................... 428/122; 49/496; 156/79; 156/244.11; 428/101; 428/358

[58] Field of Search ......................... 49/475, 492, 496; 428/71, 76, 122, 358, 83, 99, 100, 101, 310, 315; 156/79, 244.11

[56] References Cited

U.S. PATENT DOCUMENTS

| | | | |
|---|---|---|---|
| 2,724,877 | 11/1955 | Ramsay | 49/496 |
| 3,378,956 | 4/1968 | Parks et al. | 49/497 |
| 3,564,773 | 2/1971 | Bonnaud | 49/490 |
| 3,700,368 | 10/1972 | Wells | 425/363 |
| 3,781,390 | 12/1973 | Wells | 264/46.7 |
| 3,941,543 | 3/1976 | Buonanno | 425/371 |
| 4,123,100 | 10/1978 | Ellis | 49/490 |

*Primary Examiner*—William J. Van Balen
*Attorney, Agent, or Firm*—Cushman, Darby & Cushman

[57] ABSTRACT

A sealing element for attachment to a door, window or other structure comprises a resilient foam core enveloped by a wrap-around outer cover having a flexible portion and a relatively rigid portion for attaching the seal to another structure. The cover has opposite edges which are configured to lock together so as to contain the foam core. The seal may be produced by coextruding the portions of the cover, partially shaping the cover, laying in foamable core material, further shaping the cover, locking the edges of the cover together and causing the core material to foam within the interior of the thus-closed cover.

19 Claims, 2 Drawing Figures

SEAL HAVING RESILIENT CORE AND OUTER COVER

This invention relates to a seal having a resilient core and an outer cover and to a method for making the seal. In particular, the invention relates to such a seal in which the cover includes a relatively rigid flange or projection by means of which the seal can be attached to another structure and/or in which the cover is preformed as a separate wrap-around member having opposite edges which engage and interlock with each other when the cover is shaped to the desired tube-like configuration.

BACKGROUND AND SUMMARY OF THE INVENTION

A known form of seal comprises a polymeric resilient foam core and an enveloping cover in the form of a thin film of polymeric material. Such seals have been made by shaping the bottom of an elongated strip of the film about a longitudinal dimension of the strip, laying in material that will foam and overlapping the edges of the film to form a hollow tube-like structure and then foaming the material to form the resilient core, as disclosed in U.S. Pat. Nos. 3,700,368, 3,781,390 and 3,941,543. As the film, being uniformly thin and flexible, does not provide any rigidity to the seal, it is conventional to incorporate an elongated relatively rigid element as an aid in attaching the seal to another structure. On occasion the overlapped edges of the film allow some of the foam to bleed through or escape during the foaming step, resulting in an unsightly or defective product.

One object of the present invention is to provide a seal comprising a resilient elongated foam core enveloped around its circumference by a cover of polymeric material, the cover having a flexible hollow portion filled with at least part of the core and having at least one relatively rigid flange-like, portion protruding laterially and extending the length of the seal for attaching the seal to another structure. Preferably the cover is formed by extruding the flexible and rigid portions simultaneously in such a way that the portions become bonded to each other edge-to-edge as they are extruded, thereby forming a single integral member. In particular, the cover can be formed by extruding three portions, one extrusion forming a flexible longitudinal central portion of the integral member and the other two extrusions being relatively rigid and being bonded to opposite edges of the central portion. The member is then shaped around a longitudinal dimension to form a hollow structure into which foamable material is placed.

Another object of the present invention is to provide a seal comprising a resilient elongated foam core enveloped around its circumference by a cover, the cover being formed as a separate element having interlocking edge portions extending longitudinally of the seal. This configuration is particularly advantageous when the seal is made by shaping the preformed cover into a hollow tube-like structure, as referred to above, because by interlocking the edge portions of the cover the tendency of the polymeric foam to bleed or escape is eliminated. Preferably the edge portions are rigid relative to the central portion and together form a reinforcing or stiffening member in addition to performing a locking function.

DETAILED DESCRIPTION

Figure 1:
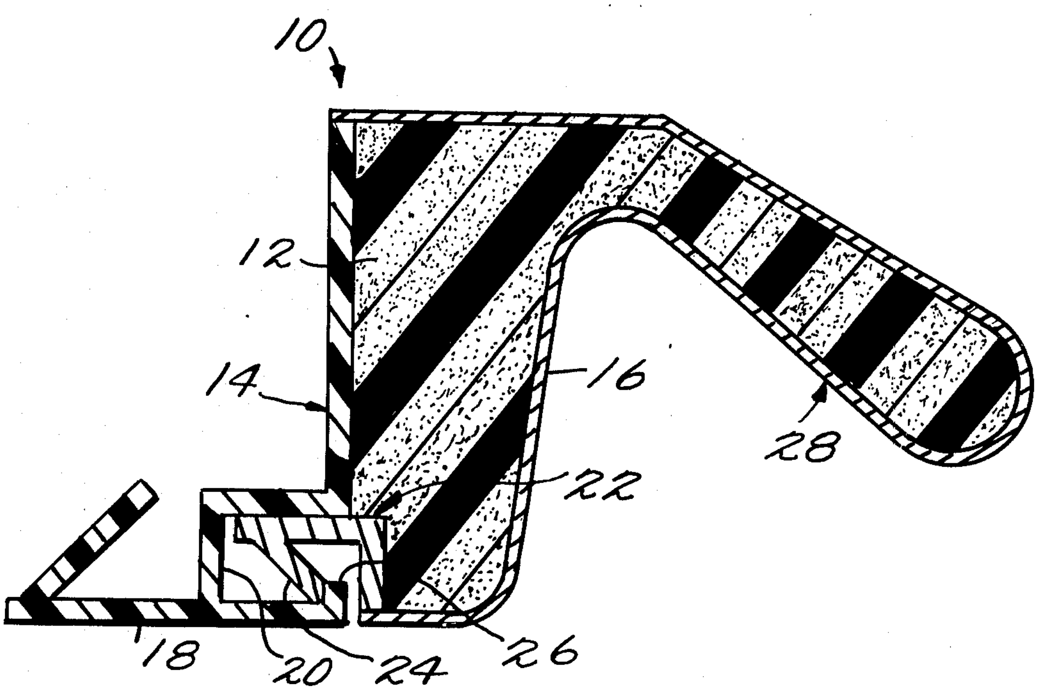
FIG. 1 is a transverse sectional view of a seal constructed in accordance with the invention.

FIG. 1 illustrates in transverse cross-section an elongated seal 10 such as might be used between a door and its jamb or between a window sash and its frame. The seal 10 includes a compressible resilient core 12 such as a polymeric foam enveloped in an outer relatively impermeable tube-like cover 14. A body portion 16 of the cover 14 is flexible and another portion 18 is relatively rigid. In the illustrated embodiment the rigid portion 18 projects outwardly from the body portion 16 and can serve as a means for attaching the seal to a supporting structure. For example, the portion 18 can be secured to a surface of the supporting structure or it can be frictionally engaged in a kerf in the supporting structure.

The rigid portion 18 of the cover also forms a closure or lock to ensure that the core 12 is completely and permanently encapsulated, especially during manufacture of the seal, as described in detail hereinafter. The contours which effect the closure or lock are not critical. Preferably the closure is a detent-type coupling between two edges of the cover 14. In the illustrated embodiment the coupling includes a channel or socket 20 formed along one edge of the cover 14 and a prong 22 insertable into the socket 20. The prong 22 includes a flexible finger 24 which is deflected counter-clockwise, as viewed in the drawing, as the prong 22 is pushed into the socket 20 past an inwardly turned lip 26 on the socket 20. The finger 24 then snaps in a clockwise direction and resists being withdrawn past the lip 26.

The overall cross-sectional shape of the seal is not critical and will depend on its intended use. In the illustrated embodiment the body 16 includes a foam-filled leg 28 which is resiliently deflectable inwardly toward the remainder of the seal. In use the seal may be so mounted that, for example, the leading edge of a sliding door engages the leg 28 and deflects it counter-clockwise as the door moves into a closed position.

Figure 2:
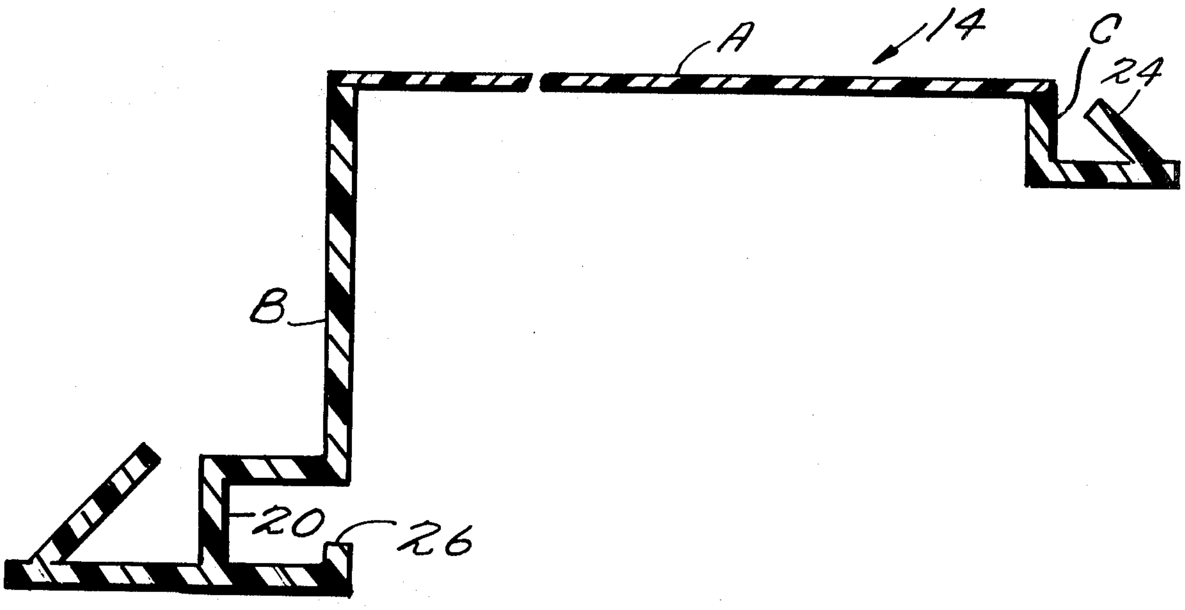
FIG. 2 is a transverse sectional view of the seal cover of FIG. 1 in its initially extruded form.

The seal 10 is produced by forming the cover separately from the core, partially shaping the cover, applying foamable core material to the partially shaped cover, locking the longitudinal edges of the cover together and causing the core material to foam. FIG. 2 illustrates the cover 14 in its initially formed, unshaped condition. In this condition the cover is an elongated strip having a flexible central portion A integral with two relatively rigid edge portions B and C. The strip can be formed of polymeric materials by an extrusion technique in which the portions A, B and C are extruded simultaneously and bonded together as they are extruded. A first extruder extrudes the polymeric material of the central portion A through an opening in a die and a second extruder extrudes the polymeric material of the edge portions B and C through two further openings in the same die. The portions A, B and C become bonded to each other upon issuing from their respective die openings.

The strip is then shaped by bending its flexible portion A about a longitudinal dimension, as in a mold, so that the edge portion C swings clockwise as viewed in FIG. 2. The resulting structure is generally channel-shaped. Plastic core material which will foam is placed in the channel and then edge portions B and C are coupled together by inserting the projection 22 into the socket 20. The foamable material expands to fill and form the core 12. The relatively rigid edge portions B and C, having been coupled together, prevent any leakage of foam from the shaped structure during the foaming step. At the same time the relatively rigid edge portions B and C provide the relatively rigid flange-like structure 18 by means of which the seal can be attached to another structure. In addition the edge portions B and C aid in locating the initially foamed cover in the mold prior to injecting the foam core.

The materials used for the cover portions A, B and C are not critical, provided that the necessary flexibility and rigidity are achieved. Polyvinylchloride is a suitable material for both the flexible and relatively rigid portions. High density polyethylene can be used for the rigid portions B and C and an ethylene copolymer can be used for the flexible portion A. Also, polypropylene can be used for the rigid portions and polypropylene copolymer for the flexible portion. The resistant foam core may be polyurethane foam.

The provision of the rigid portions B and C as an integral part of the cover is often an advantage over the prior construction in which a separate rigid member is enveloped by a thin cover film, because the latter construction does not have as great a holding power when the rigid portion is inserted into a kerf in a wooden structure. Also, the prior construction does not lend itself to a great variety of configurations of the rigid portion, whereas the present construction is much more versatile.

What is claimed is:

1. A seal comprising a resilient elongated foam core enveloped around its circumference by a cover of polymeric material, said cover having a flexible hollow portion filled with at least part of said core and having a relatively rigid portion protruding from the seal and extending along the length of the seal for attaching the seal to another structure.

2. A seal as in claim 1 wherein said cover is an extruded member having at least one flexible portion and at least one relatively rigid portion, said extruded member having opposite edges and being wrapped around said core with said edges being in engagement with each other.

3. A seal as in claim 2 wherein each of said opposite edges is relatively rigid, said two edges together thereby forming said rigid portion of said wrapped cover.

4. A seal as in claim 2 or claim 3 wherein said core is a body of polymeric foam extruded into the wrapped cover.

5. A seal as in claim 2 or claim 3 wherein said edges of said extruded cover are configured to interlock with each other so as to contain said foam core.

6. A seal as in claim 5 wherein said edges together form a detent coupling.

7. A seal comprising a resilient elongated foam core enveloped around its circumference by a cover, said cover being formed as a separate element and having interlocking edge portions extending longitudinally of the seal.

8. A seal as in claim 7 wherein said cover is a wrapping around said core.

9. A seal as in claim 7 or claim 8 wherein said interlocking edge portions together form a detent coupling.

10. A seal as in any one of claims 7, 8 or 9 wherein said interlocking edge portions are rigid relative to the remainder of said cover.

11. A seal as in claim 9 wherein said cover is an extruded member of polymeric material shaped to the configuration of said seal and subsequently filled with said foam core.

12. A seal as in claim 9 wherein said interlocking edge portions project laterally from the remainder of said seal so as to provide a means for attaching said seal to another structure.

13. A cover element for use in making an elongated seal comprising an elongated member having a longitudinal central portion and longitudinal side edge portions, said central portion being bendable about the longitudinal dimension of said member to form a hollow structure and said edge portions being configured to interlock with each other when brought into engagement with each other.

14. A cover element as in claim 13 wherein said longitudinal edge portions are configured to form a detent coupling.

15. A cover element as in claim 13 or claim 14 wherein said edge portions are rigid relative to said central portion.

16. A cover element as in claim 15 wherein said elongated member is extruded from polymeric material, said edge portions and said central portion being extruded simultaneously and bonded together upon extrusion.

17. A method of making a seal comprising forming an elongated member having a flexible longitudinal central portion and longitudinal side edge portions configured to interlock when brought into engagement with each other, shaping said elongated member about a longitudinal dimension so as to form a hollow structure and engaging and interlocking said edge portions, and filling the hollow structure with a resilient polymeric material.

18. A method as in claim 17 wherein said central portion and said edge portions are extruded simultaneously and bonded together upon extrusion, said edge portions being rigid relative to said central portion.

19. A method as in claim 17 or 18 wherein said cover is initially shaped to a generally channel-shaped structure, wherein foamable core materials is laid into the channel-shaped structure before said edge portions are interlocked and wherein said core material is thereafter caused to foam.

* * * * *